United States Patent [19]

Bowsky

[11] 4,308,323
[45] Dec. 29, 1981

[54] BATTERY SEAL
[75] Inventor: Benjamin Bowsky, Maineville, Ohio
[73] Assignee: Emerson Electric Co., St. Louis, Mo.
[21] Appl. No.: 205,509
[22] Filed: Nov. 10, 1980
[51] Int. Cl.³ .............................................. H01M 2/02
[52] U.S. Cl. .................................... 429/181; 429/174
[58] Field of Search ................................ 429/181–185, 429/174

[56] References Cited
U.S. PATENT DOCUMENTS 3,416,964 12/1968 Michalko ..................... 429/181 X
4,127,702 11/1978 Catanzarite ................... 429/181 X
4,233,372 11/1980 Bro et al. ........................ 429/181 X
4,264,688 4/1981 Catanzarite ................... 429/185 X Primary Examiner—Charles F. LeFevour
Attorney, Agent, or Firm—Polster, Polster and Lucchesi

[57] ABSTRACT

A graded glass battery seal is provided wherein at least two glasses are employed, one bonded to a terminal pin, the other to the battery wall, the glasses having sufficiently different electrical/chemical properties to produce a greater resistance to chemical attack than is exhibited by either glass alone.

4 Claims, 2 Drawing Figures

BATTERY SEAL

BACKGROUND OF THE INVENTION

Coaxial seals, sometimes called graded seals, are well known. They are conventionally used to make glass seals between terminal pins and a wall of material with a difference in thermal expansion too great to permit the use of a single glass seal. Two glasses are used, the outer glass having a coefficient compatible with the wall material and the inner, a coefficient compatible with the pin. It has been discovered that by using two or more glasses of distinctly different electrical/chemical properties, the resistance of the seal to attack by chemicals corrosive to glass can be greatly enhanced. In particular, in a battery utilizing a lithium-sulfur dioxide system, the resistance to attack can be improved dramatically over that of the glasses individually.

One of the objects of this invention is to provide a glass seal that exhibits a greater resistance to attack than the individual glasses used in making the seal.

Other objects will become apparent to those skilled in the art in the light of the following description and accompanying drawing.

SUMMARY OF THE INVENTION

In a battery containing at least one chemical corrosive to glass, the battery having a terminal pin extending from within the battery through a wall and projecting outside the wall, and a glass seal between the pin and the wall, the seal being of the graded type wherein at least two glasses are employed, one bonded to the pin and the other to the wall and bonded, mediately or immediately, to one another, the seal of this invention comprises two glasses of sufficiently different electrical/chemical properties to produce a greater resistance to attack from a chemical in the battery than is exhibited by either of the glasses alone.

DESCRIPTION OF THE PREFERRED EMBODIMENT

Figure 1:
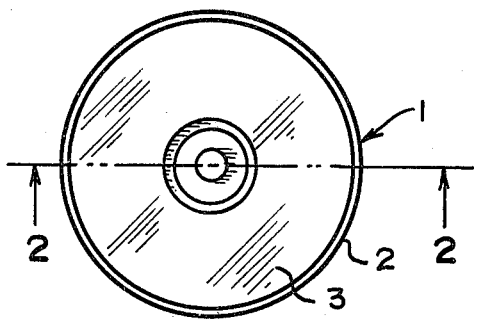
FIG. 1 is a top plan view of a battery employing a seal of this invention.
Figure 2:
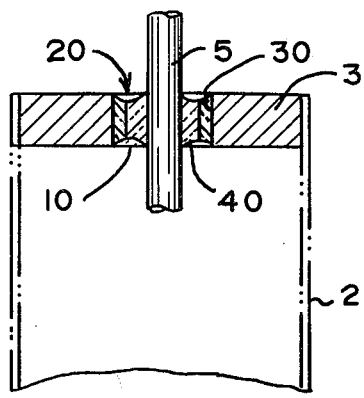
FIG. 2 is a fragmentary sectional view taken along the line 2—2 of FIG. 1.

Referring now to the drawing, reference numeral 1 indicates a battery which, in this embodiment, is of the lithium sulfur dioxide type. The battery has a side wall 2 and a top wall 3, which may be made in one piece. In the illustrative embodiment, the top wall 3 is stainless steel. A terminal pin or electrode 5, which in this embodiment is made of tantalum, extends from the interior of the battery, through an opening 10 in the wall 3, and projects outside the battery. The pin 5 is sealed to the top wall 3 by means of a coaxial or graded seal 20. The seal 20 is made up of an outer glass 30 and an inner glass 40. The outer glass 30, in the form of an annulus, is bonded by fusing it to the surface of the wall defining the opening 10. The inner glass 40 is bonded by fusing it to the outer surface of the pin 5. The glasses 30 and 40 are fused to one another.

Merely by way of illustration, glasses having the following composition, by weight percent and calculated as the oxides except for the calcium fluoride, are suitable for use in the seal of this invention:

|   | $SiO_2$ | $B_2O_3$ | $K_2O$ | $Na_2O$ | $Al_2O_3$ | $BaO$ | $LiO$ | $CaF_2$ |
|---|---|---|---|---|---|---|---|---|
| A. | 64.08 | 12.3 | 5.8 | 6.0 | 3.5 | 7.4 | 0.1 | 0.82 |
| B. | 64.0 |  | 10.0 | 5.0 |  | 20.0 | 1.0 |  |
| C. | 68.4 | 22.1 | 4.0 | 3.5 | 2.0 |  |  |  |

When, as has been indicated, a tantalum pin is used with a stainless steel body, the outer glass can have composition B, and the inner glass, composition A.

If a cobalt-iron terminal pin, such as KOVAR or RODAR, is used with a stainless steel body, the outer glass can again have composition B, and the inner glass, composition C.

The mechanism by which the superior results are obtained forms no part of this invention, and is not understood, but it is believed that it may have to do with some combination of variance in glass conductivity, variance in glass capacitance and variance in the electron transfer rate and flow direction in the two glasses. In any event, the combinations of glasses given as examples produce seals that are more resistant, by orders of magnitude, than are the individual glasses, to corrosion in a lithium-sulfur dioxide battery.

Numerous variations in the composition of the seal within the scope of the appended claims will occur to those skilled in the art in the light of the foregoing disclosure. Merely by way of example, the compositions given can be varied through a considerable range, even in the illustrative applications given, one of the chief factors in the illustrative examples being that the inner glasses contain at least ten percent by weight of boron oxide, and the outer, substantially none. The compositions can be varied for use with different corrosive chemicals. A three glass component system can be used, particularly where the coefficients of expansion of the pin and body are such as to make the use of the two component system described difficult. These are merely illustrative.

I claim:

1. In a battery containing at least one chemical corrosive to glass, said battery having a terminal pin extending from within said battery, through a wall, and projecting outside said wall, and a glass seal between said pin and said wall, said seal being of the graded type wherein at least two glasses are employed, one bonded to the pin, and another to the wall and bonded, mediately or immediately, to one another, the improvement comprising said two glasses' being of sufficiently different electrical/chemical properties to produce a greater resistance to attack from said chemical than is exhibited by either of said glasses alone.

2. The improvement of claim 1 wherein the battery is a lithium-sulfur dioxide system battery.

3. The improvement of claim 1 or 2 wherein one of the glasses contains at least ten percent boron oxide and the other contains substantially none.

4. The improvement of claim 1, 2 or 3 wherein one of the glasses has approximately the following composition, by weight percent: silica 64, potassium oxide 10, sodium oxide 5, barium oxide 20, and lithium oxide 1, and the other glass is taken from the group consisting of a glass with approximately the following composition by weight percent: silica 64, boron oxide 12.3, potassium oxide 5.8, sodium oxide 6.0, aluminum oxide 3.5, barium oxide 7.4, lithium oxide 0.1 and calcium fluoride 0.8, and a glass with approximately the following composition by weight percent: silica 68.4, boron oxide 22.1, potassium oxide 4.0, sodium oxide 3.5 and aluminum oxide 2.0.

* * * * *